US012729155B2

(12) United States Patent
Raggio

(10) Patent No.: US 12,729,155 B2
(45) **Date of Patent: *Sep. 8, 2026**

(54) METHOD FOR MANUFACTURING A FUSED METAL SIGHT WINDOW WITH A HIGH FLOW TEMPERATURE OPTICAL MATERIAL

(71) Applicant: RAYOTEK SCIENTIFIC, LLC, San Diego, CA (US)

(72) Inventor: William Raggio, Del Mar, CA (US)

(73) Assignee: RAYOTEK SCIENTIFIC, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/261,941

(22) Filed: Jul. 7, 2025

(65) Prior Publication Data

US 2025/0333356 A1 Oct. 30, 2025

Related U.S. Application Data

(63) Continuation of application No. 18/153,513, filed on Jan. 12, 2023, now Pat. No. 12,371,370.

(51) Int. Cl.

*C03C 27/02* (2006.01)
*C01B 19/04* (2006.01)
*C01F 7/021* (2022.01)

(52) U.S. Cl.

CPC .............. *C03C 27/02* (2013.01); *C01B 19/04* (2013.01); *C01F 7/021* (2013.01)

(58) Field of Classification Search

CPC ....... C03C 27/02; C01B 19/04; C01B 19/007; C01F 7/021

See application file for complete search history.

(56) References Cited

U.S. PATENT DOCUMENTS 5,146,481 A 9/1992 Garg et al.
5,530,246 A * 6/1996 Hawkins ................ G02B 23/12 250/342
6,499,439 B1 12/2002 Kohler et al.
(Continued)

FOREIGN PATENT DOCUMENTS

DE 102020124916 A1 * 3/2022 ........... B23K 1/0008
EP 3974400 A1 * 3/2022 ........... C03C 27/044

OTHER PUBLICATIONS

U.S. Appl. No. 18/153,513, filed Jan. 12, 2023.
International Preliminary Report on Patentability Issued in PCT/US2024/011515 on Jul. 24, 2025.

*Primary Examiner* — George R Koch
(74) *Attorney, Agent, or Firm* — ARC IP Law, PC; Joseph J. Mayo

(57) ABSTRACT

A method for manufacturing a fused metal sight window that melts the metal of the frame around the window, instead of the traditional method of melting the window into the frame. Since most of the superior optical transparent materials (such as fused silica, sapphire, YAG, ALON, diamond, fused quartz and magnesium fluoride) have a melting point higher than most metals, it was not previously possible to create fused metal sight windows with these materials. By melting the frame onto the window, many new combinations of metals and optical materials may be used while retaining the strength of the sight window that results from fusing the metal and the window.

12 Claims, 8 Drawing Sheets

(56) References Cited

U.S. PATENT DOCUMENTS

| | | | | |
|---|---|---|---|---|
| 9,171,899 | B2 | 10/2015 | Umehara et al. | |
| 9,221,289 | B2 | 12/2015 | Prest et al. | |
| 10,071,539 | B2 | 9/2018 | Matsuyuki et al. | |
| 10,914,910 | B2 | 2/2021 | Navabi | |
| 12,371,370 | B2 * | 7/2025 | Raggio | C01B 19/007 |
| 2004/0188124 | A1 * | 9/2004 | Stark | H10F 77/50 174/535 |
| 2012/0034403 | A1 * | 2/2012 | Paterek | G01F 23/02 428/609 |

* cited by examiner

Top View
Side View
202a
201a
202b
201b
202c
201c
210
Window melt @ $T_w$
201
211
212
Frame melt @ $T_m$: $T_m > T_w$
202
Assemble
205
Heat to T: $T_w < T < T_m$
206
Cool
208

Obtain Window with Optical Material having flow temp > $T_t$;
401
421
411
Obtain Frame with Metal Material having melting temp $T_m \leq T_t$; outer window edge fits inside inner frame edge
402
422
412
Assemble Window inside Frame
405
Heat to T: $T_m \leq T \leq T_t$
406
416
Maintain until inner frame edge flows onto outer window edge and fuses
407
Cool Window and Frame
408
Fused Metal Sight Window
430

Top View
Side View
430
422a
421a
422b
421b
422c
421c
410
Assemble Window inside Frame
Heat to T: $T_m \leq T \leq T_t$
Cool Window and Frame
405
406
408

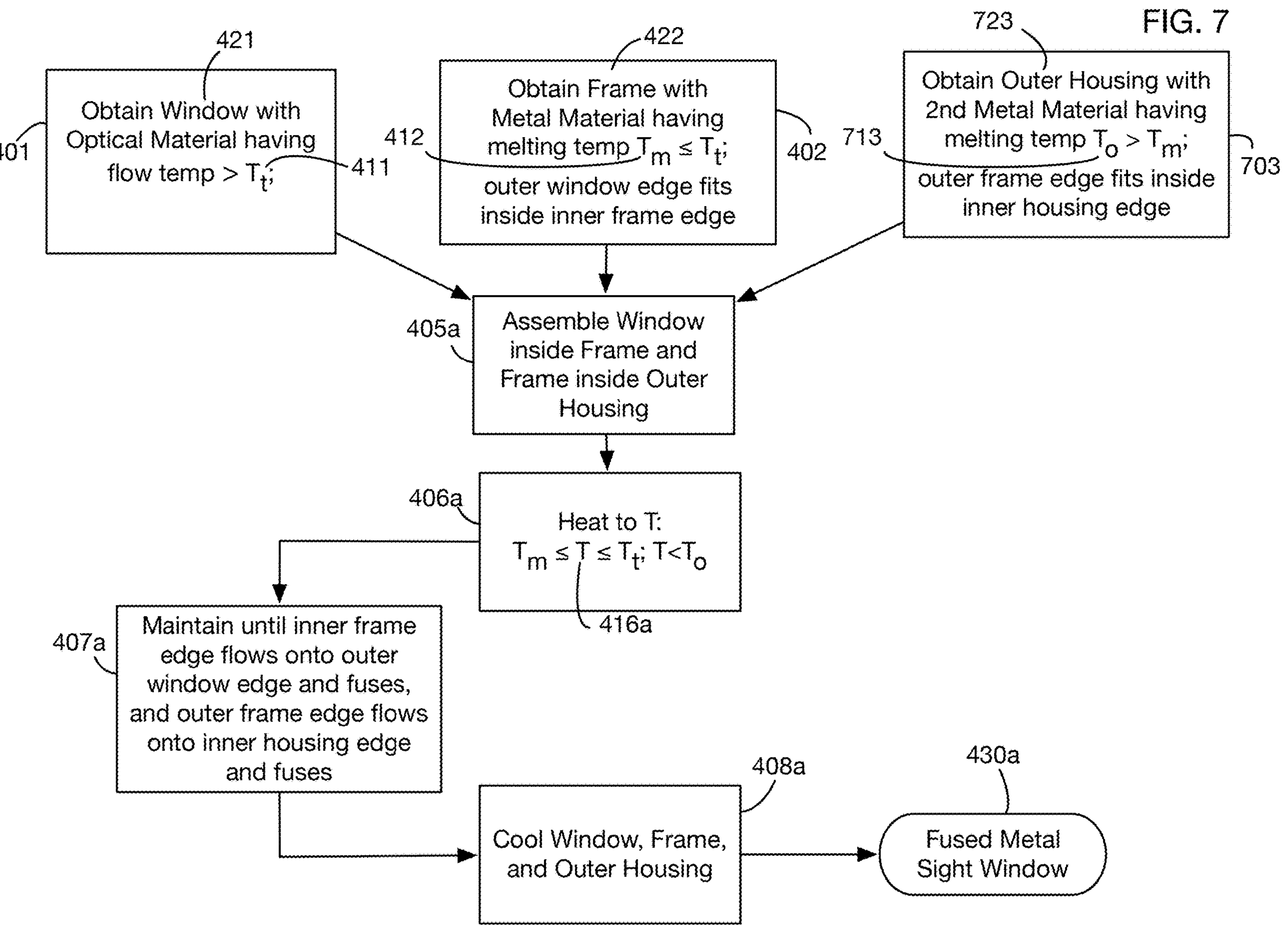
FIG. 7
421
401
Obtain Window with Optical Material having flow temp > $T_t$;
411
422
412
Obtain Frame with Metal Material having melting temp $T_m \le T_t$; outer window edge fits inside inner frame edge
402
723
713
Obtain Outer Housing with 2nd Metal Material having melting temp $T_o > T_m$; outer frame edge fits inside inner housing edge
703
405a
Assemble Window inside Frame and Frame inside Outer Housing
406a
Heat to T: $T_m \le T \le T_t$; $T<T_o$
416a
407a
Maintain until inner frame edge flows onto outer window edge and fuses, and outer frame edge flows onto inner housing edge and fuses
408a
Cool Window, Frame, and Outer Housing
430a
Fused Metal Sight Window Side View
Top View
405a
Assemble Window inside Frame, Frame inside Outer Housing
406a
Heat to T: T_m ≤ T ≤ T_t; T<T_o
408a
Cool Window, Frame, and Outer Housing
723a
422a
421a
723b
422b
421b
723c
422c
421c

METHOD FOR MANUFACTURING A FUSED METAL SIGHT WINDOW WITH A HIGH FLOW TEMPERATURE OPTICAL MATERIAL

This patent application is a continuation of U.S. patent application Ser. No. 18/153,513 filed 12 Jan. 2023, the specification of which is hereby incorporated herein by reference.

BACKGROUND OF THE INVENTION

Field of the Invention

One or more embodiments of the invention are related to the field of manufacturing methods for sight windows. More particularly, but not by way of limitation, one or more embodiments of the invention enable a method for manufacturing a fused metal sight window with a high flow temperature optical material.

Description of the Related Art

Sight windows provide viewing ports through which operators can observe processes occurring inside containers such as industrial chemical vessels, or outside of a system that is subjected to external pressures, temperatures, and chemicals such as a submersible or down an oil well. Sight windows need to withstand the harsh environment of the container or the external environment, including potentially very high pressures and temperatures and exposure to dangerous chemicals without cracking or otherwise failing. To provide the required robustness, sight windows are often made from a glass disk that is fused into a metal frame. Directly fusing the glass into the frame eliminates points of failure such as gaskets or other types of seals. Eliminating the need for seals and gaskets increases the lifetime of sight windows by years if not decades. Fusing the glass into the frame also strengthens the glass because the metal frame contracts around the disk as it cools, compressing the disk and making it stronger.

Existing fused glass sight windows are manufactured by melting the glass into the metal frame. The metal has a coefficient of thermal expansion higher than the glass, causing the metal to compress onto the glass as the fused assembly cools down. This traditional method works well where the glass type transparent window material has a softening point low enough to not melt the metal or cause unnecessary grain growth in the metal (weaking the metal). This means, for most applications, the softening point to flow must be less than 1000 C. This can be a limitation when there is a need for a higher temperature glass such as fused silica, aluminosilicate, and fused quartz glasses, or, for crystalline materials, such as sapphire, zinc selenide and diamond, where the crystal structure will be damaged if melted, or sintered materials (e.g., ceramics) such as alumina, zirconia and nitride refractories that will not melt without destroying the material.

For at least the limitations described above there is a need for a method for manufacturing a fused metal sight window with a high flow temperature optical material.

BRIEF SUMMARY OF THE INVENTION

One or more embodiments described in the specification are related to a method for manufacturing a fused metal sight window with a high flow temperature optical material. Embodiments of the invention may melt the metal of a frame around the window, which is the opposite of the traditional process for making a fused sight window that melted glass into the metal frame.

One or more embodiments of the invention may enable a method for manufacturing a fused metal sight window with a high flow temperature optical material. The method may include the steps of obtaining a window, obtaining a frame, placing the window inside the frame, heating the window and frame until the frame melts and fuses with the window, and cooling the window and frame to form a fused metal sight window. The window may include an optical material that can be heated to a threshold temperature at or below which the optical material does not flow and is not damaged. The window may have an outer window edge. The frame may include a metal with a metal temperature below the threshold temperature. The frame may have an inner frame edge and an outer frame edge. The outer window edge may fit inside the inner frame edge. The heating step may heat the window and frame to a temperature greater than or equal to the melting temperature and less than or equal to the threshold temperature. Heating may continue until the inner frame edge flows onto the outer window edge and the metal of the inner edge of the frame fuses with the outer edge of the optical material of the window.

In one or more embodiments of the invention the frame may have the shape of a ring. In one or more embodiments the frame may be of a geometrical shape other than a ring. In one or more embodiments the outer edge of the window may have a circular shape, and the inner edge of the frame may have a circular shape.

In one or more embodiments the optical material of the window may be a crystalline optical material. In one or more embodiments the optical material may include one or more of fused silica, aluminosilicate, borosilicate glass, YAG, ALON, sapphire, zinc selenide, zinc sulfide, quartz crystal, fused quartz, diamond, magnesium fluoride.

In one or more embodiments the optical material may include sapphire, and the metal may include one or more of stainless steel, Inconel®, Hastelloy®, a nickel-based alloy, copper, brass, gold, titanium, platinum, and rhodium.

In one or more embodiments the process for manufacturing a fused metal sight window may also include obtaining an outer housing, placing the frame inside the outer housing and the window inside the frame, and heating all components until the inner frame edge flows onto the outer window edge and fuses with the window, and the outer frame edge flows onto the inner edge of the outer housing and fuses with the outer housing. The window, frame, and outer housing may be cooled to form the fused metal sight window. The outer housing may include a second metal with a second melting temperature greater than the melting temperature of the metal of the frame. The outer frame edge may fit inside the inner edge of the outer housing. In one or more embodiments the optical material of the window may include zinc selenide, the second metal of the outer housing may include stainless steel, and the metal of the frame may include a transition metal. In one or more embodiments the inner frame edge may flow onto the outer window edge without using capillary action, and the outer frame edge may flow onto the inner housing edge without using capillary action. The process of joining the window, the frame, and the outer housing to form the fused metal sight window may use neither brazing nor soldering in one or more embodiments.

BRIEF DESCRIPTION OF THE DRAWINGS

The above and other aspects, features and advantages of the invention will be more apparent from the following more particular description thereof, presented in conjunction with the following drawings wherein:

FIG. 7 shows a variation of the flowchart of FIG. 4 that may be used when the material of the sight window housing has a melting temperature that is high enough to damage the window material.

DETAILED DESCRIPTION OF THE INVENTION

A method for manufacturing a fused metal sight window with a high flow temperature optical material will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
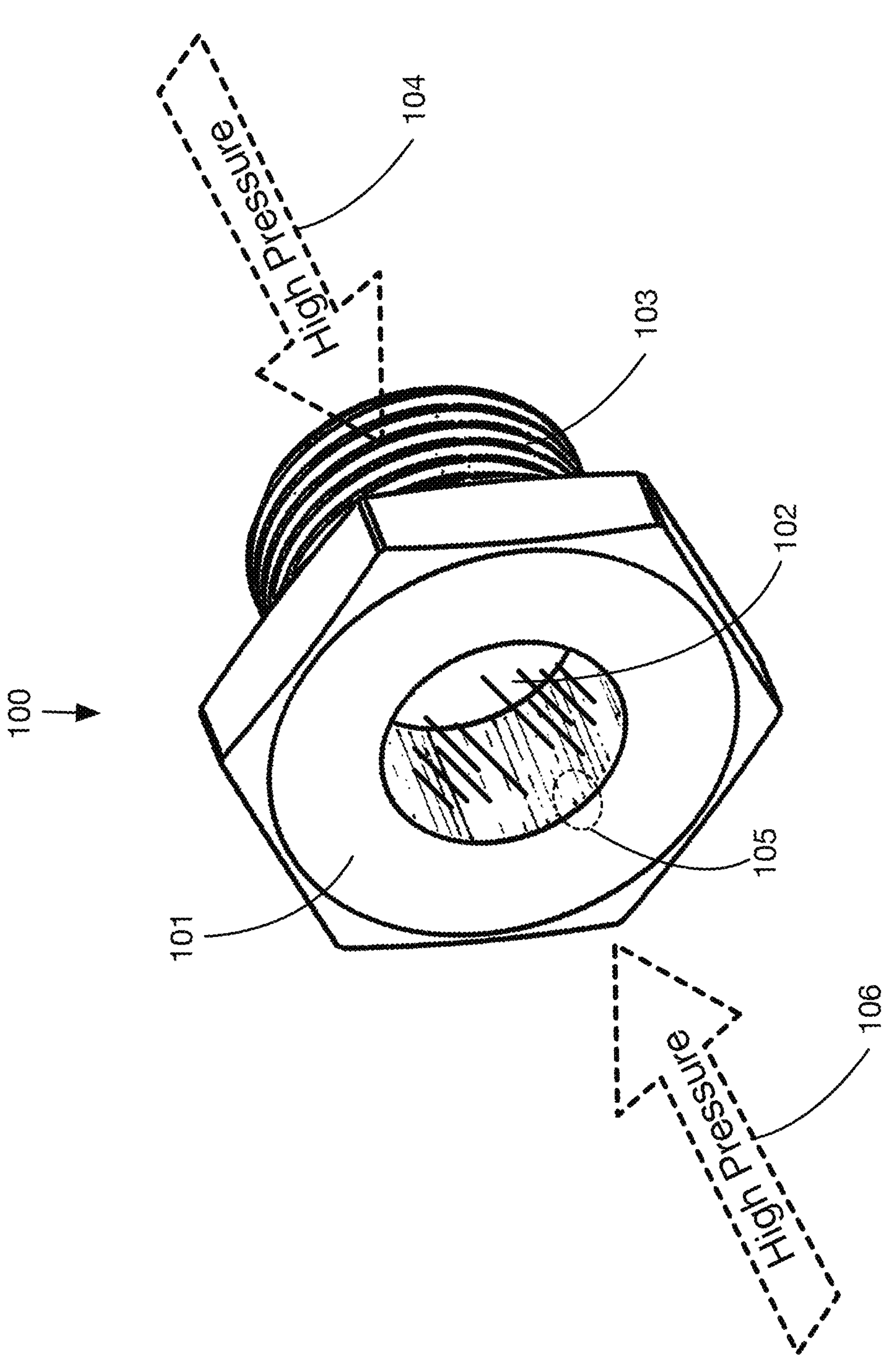
FIG. 1 shows a typical fused glass sight window with a transparent window fused into a metal frame.

FIG. 1 shows an illustrative fused glass sight window 100 with a transparent window 102 inside a metal frame 101. The sight window may also have features such as threads 103, bolt holes on a flange, or other fixtures to support installing the sight window into equipment. Sight windows may be of any shapes and sizes. In this illustrative sight window 100, the material of window 102 is fused with the metal of the frame 101 at the boundary 105 between the glass (or other optical material) and the metal of the frame. Fusing the glass and the metal generates a strong sight window that can withstand high pressure 104 pressing outward (or high pressure 106 pressing inward) onto the window.

Figure 2:
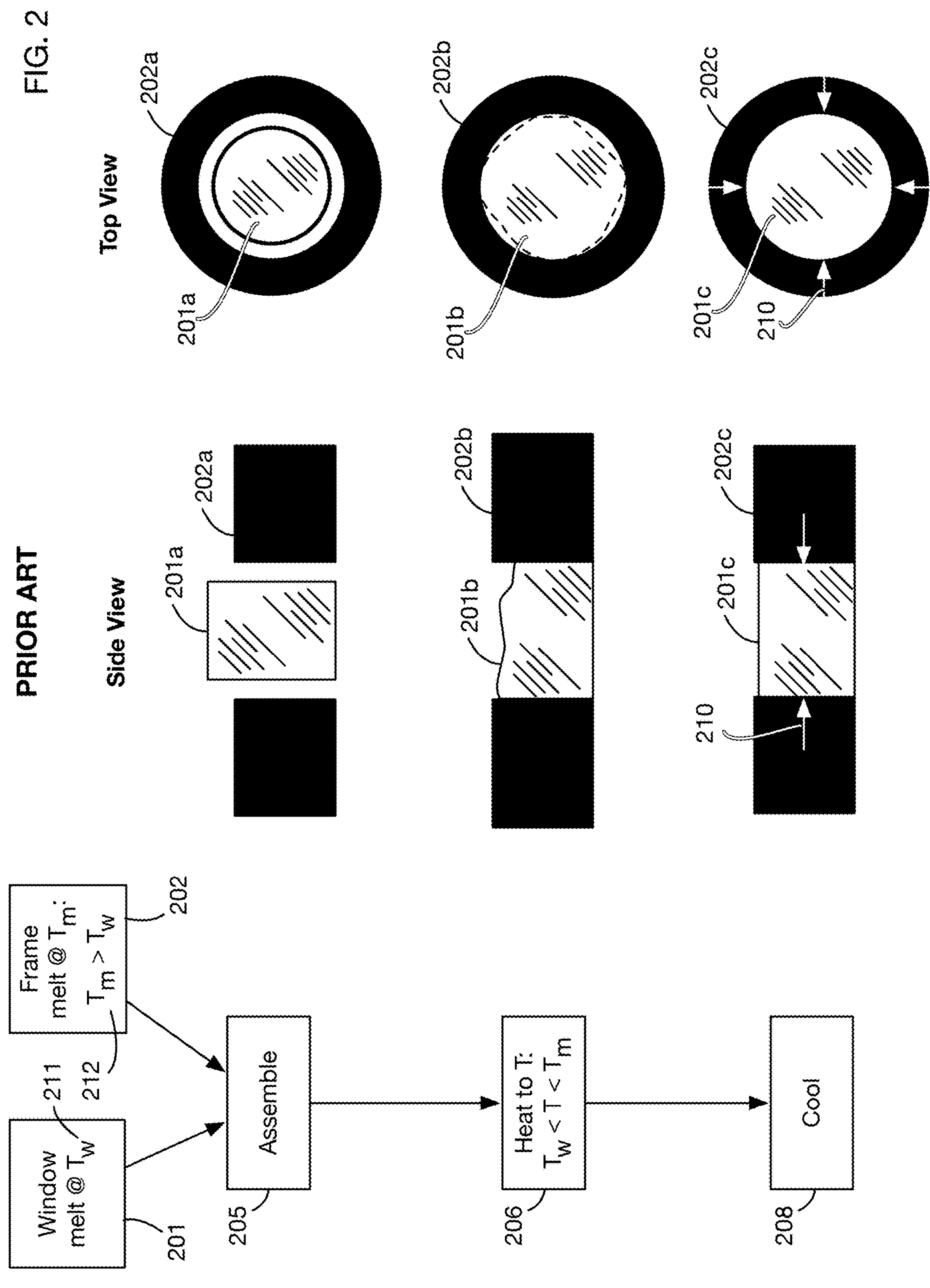
FIG. 2 shows a typical manufacturing process used in the art to manufacture a fused glass sight window; this process heats the glass so that it flows into the containing metal frame.

FIG. 2 illustrates a typical manufacturing method used in the art to construct a fused glass sight window. A window 201 is obtained with a transparent material such as a glass, and a frame 202 is obtained that typically is made of metal. Because the existing methods known in the art melt the material of the window so that it flows into the metal frame, the melting temperature 211 of the window's optical material must be lower than the melting temperature 212 of the metal in the frame 202. This constraint significantly limits the materials that can be used for fused sight windows with the existing manufacturing methods. Most of the superior optical transparent material have a melting point higher than most metals. Optical materials such as fused silica, aluminosilicate, borosilicate glass, sapphire, YAG, ALON, diamond, fused quartz and magnesium fluoride are examples of window materials that currently cannot be fused into a metal ring because of their high melting point. There are only a few types of glass that can be melted into metal rings per the traditional methods. These glasses, such as soda lime glass and borosilicate glass, are not optical materials. There are very few optical glasses that can be melted into common low melting commercial metals such as aluminum, brass, copper or even gold. Crystalline optical material cannot be melted, eliminating them as options in making fused glass sight windows the traditional way. Some of the most important optical materials are crystalline, such as YAG, Sapphire, Zinc Selenide, Zinc sulfide, quartz crystals and diamond.

FIG. 2 illustrates the subsequent steps 205, 206, and 208 of an existing manufacturing process for a fused sight window, with side cross-section views and top views of the components as the sight window is being manufactured. In step 205, the window 201*a* is placed inside the metal frame 202*a*, with a small gap between them. Window 201*a* in its initial state is for example a glass blank in the form of a puck. Step 206 then heats the assembly (window and frame) to a temperature that is above the melting point 211 of the window material and below the melting point 212 of the metal frame material. This causes the window blank to flow in state 201*b* into the metal frame. The frame also expands somewhat into state 202*b* due to the heat. Step 208 then cools the assembly leaving the final window 201*c* fused with the sides of the metal frame 202*c*. As the frame contracts during cooling, due to it having a higher coefficient of thermal expansion than the optical window, it exerts compressive forces 210 on the edges of the window 201*c*, strengthening the window.

Figure 3A:
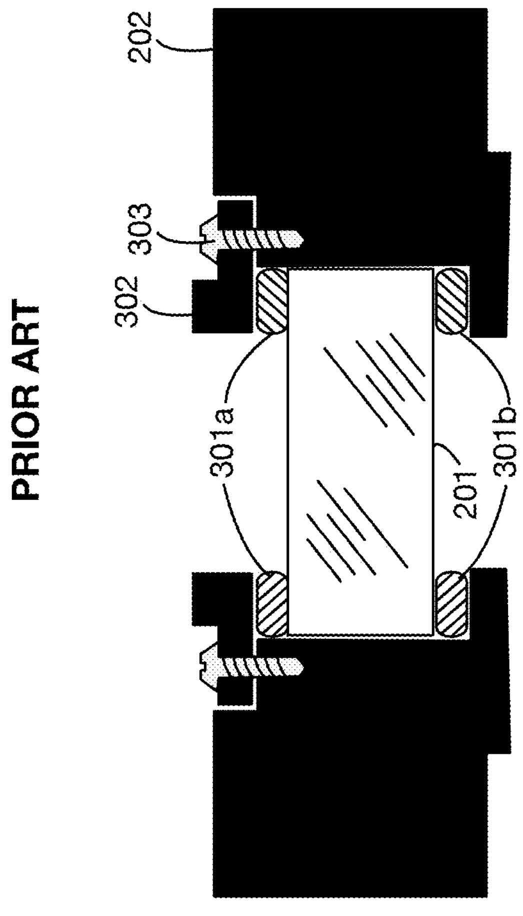
FIGS. 3A and 3B show alternative methods used in the art when the window cannot be melted into the frame; sight windows created using these methods are not as robust as fused sight windows.
Figure 3B:
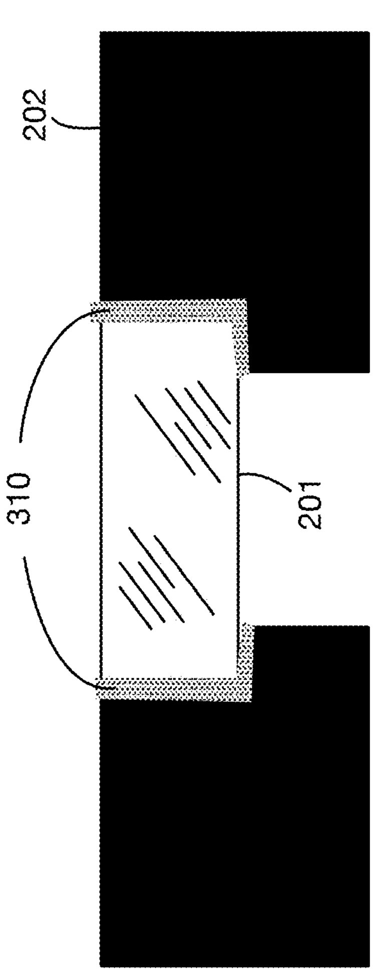

As described above, the method shown in FIG. 2 cannot be used with many desirable types of optical materials, because the melting temperatures of these materials are too high. For applications where these materials are essential, other methods are currently used to construct sight windows, as shown in FIGS. 3A and 3B. These other methods generate inferior sight windows because the metal of the frame is not fused to the material of the window. Since the metal frame is not heated using these other methods, it does not contract around the glass during a cooling process to strengthen the glass by compressing inward on it. In the method shown in FIG. 3A (in a side cross-section view), the window material 201 is sandwiched between two gaskets or O-rings 301*a* and 301*b*, which are in turn sandwiched between two metal pieces 202 and 302, for example with fasteners such as 303. This method may be used for low pressure (low strength requirements) applications, including very high temperatures where a fiber gasket is the only sealing method available. The strength of the window is defined solely on the material properties of the window material due to the window material not being under any compression. This method is not ideal for high pressure applications. In the method shown in FIG. 3B, the window material 201 is bonded into metal frame 202 with an adhesive 310. The adhesive is selected based on the environmental requirements of the sight window. As with the gasket/O-ring method of FIG. 3A, this method does not increase the strength of the window material by creating a high compression force. The strength of the window is defined solely on the material properties of the window material due to the window material not being under any compression. This method is therefore also not ideal for high pressure applications. Both of these methods are also vulnerable to chemical and thermal degradation, whereas a fused sight window has no seals to be damaged.

To address the limitations of the prior art methods as illustrated in FIGS. 2, 3A and 3B, one or more embodiments of the invention enable a method of manufacturing a fused metal sight window that melts metal around the window, rather than melting the window into the metal frame. In one or more embodiments of the invention, the transparent (for example glass or crystal) puck is created the same way that it is for the traditional fused glass method described above, but not melted. Instead, the puck may be placed in a metal frame (where the form of metal can be solid, green sintered, pressed powder, etc.) and the metal is heated hot enough to flow around the glass, cool, and thus solidifying and compressing the lower coefficient of thermal expansion window material as the assembly cools. Ultimately, this approach will result in the same high strength sight windows achieved for the low melting point glasses in metal rings.

Figure 4:
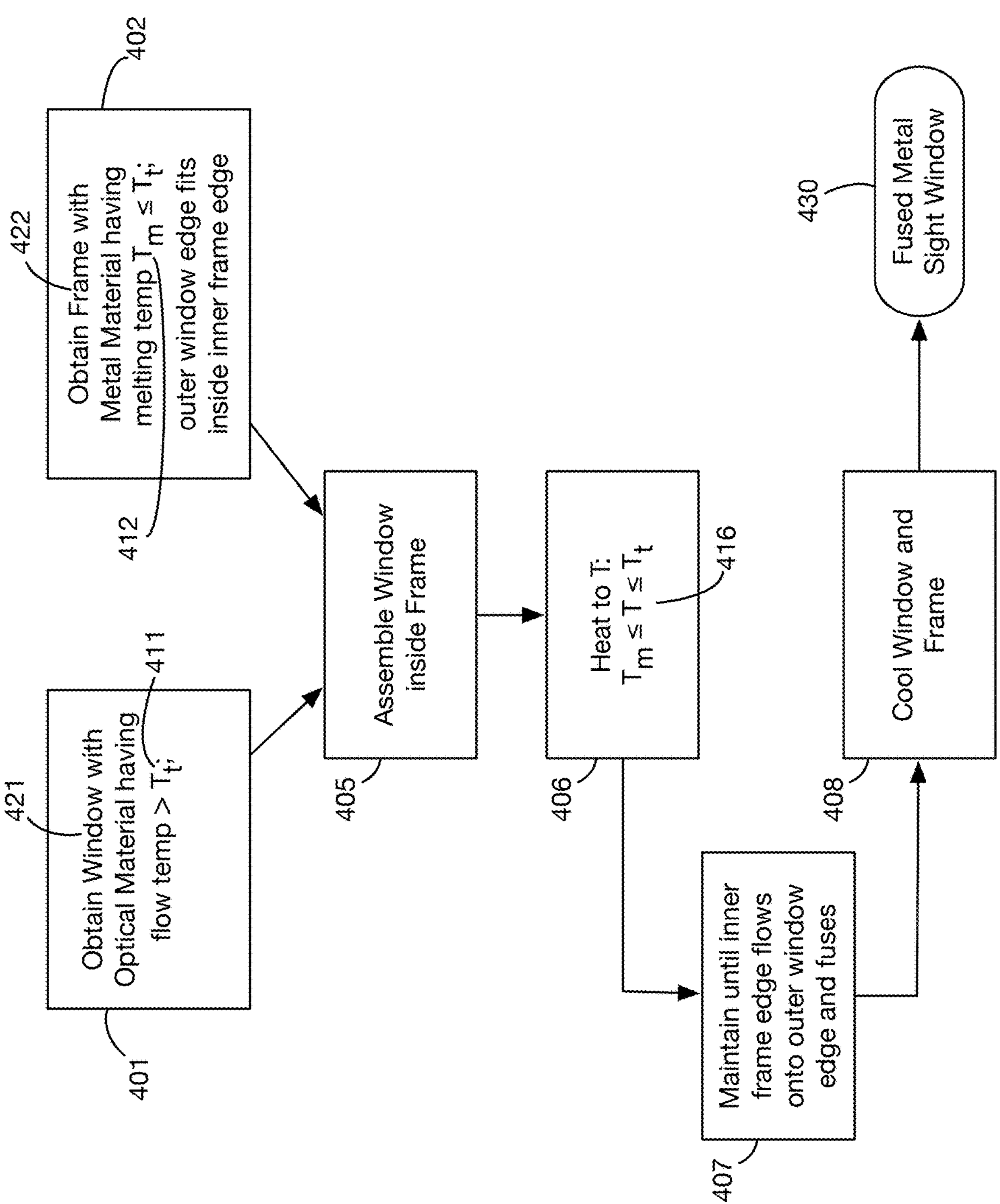
FIG. 4 shows a flowchart of an illustrative embodiment of the invention, which creates a fused sight window by melting the metal frame around the window, which is the opposite of the process currently used in the art.

FIG. 4 shows a flowchart of manufacturing steps for an illustrative embodiment of the invention. One or more embodiments of the invention may use additional steps or may use a subset of the steps shown in FIG. 4; steps may be reordered or modified as appropriate for each application. Step 401 obtains a window 421 with an optical material that is typically transparent and may have other desired properties such as strength, chemical resistance, or stability. The flow temperature of the optical material is greater than a threshold temperature 411; if the window 421 is heated to a temperature at or below this threshold temperature 411, the optical material will not flow and will not be otherwise damaged. Step 402 obtains a frame 422 with a metal material that has a melting temperature 412 at or below the threshold temperature 411; if the frame 422 is heated to a temperature at or above this melting temperature 412, the metal will melt and flow around the window.

The dimensions of the outer edge of the window are smaller than the dimensions of the inner edge of the frame, so that in step 405 the window can be placed inside the frame. In step 406 the window and frame are heated to a temperature 416 that is greater than or equal to the melting temperature 412 of the metal and less than or equal to the threshold temperature 411. At this temperature 416, the metal in the frame will melt and flow around the window, but the optical material of the window will not flow and will not be damaged. In step 407 this temperature (or any temperature in the range between 412 and 411) is maintained long enough for the inner edge of the frame to flow onto the outer edge of the window and for the metal of the frame to fuse onto the window. The assembly is then cooled in step 408, which compresses the window as the metal contracts around the window, resulting in the fused metal sight window 430. Additional steps may be performed to post-process the sight window 430, such as for example face lapping and polishing to make all surfaces optically clear, co-planar, and parallel, chemical surface treatments such as chemical conversion, plating, anodizing, and machining of metal.

In the process illustrated in FIG. 4, the window 421 may be made of any material that flows or incurs damage at a temperature greater than the melting temperature of the metal frame 422. Illustrative combinations of window and frame material may include for example a sapphire window with a stainless steel 316 metal ring, and a fused quartz, sapphire, or fused silica window with an aluminum frame. Another combination may be for example a titanium housing (with a melting point of 1668 C) around a sapphire window (with a melting point of 2030 C). This combination can only be used in an oxygen free environment; in other environments an illustrative combination may include for example a platinum/rhodium alloy frame around a sapphire window, which can be taken up to extreme temperatures in oxygen and remain un-oxidized. Another illustrative combination may include for example a frame of one or more of stainless steel, Inconel®, Hastelloy®, a nickel-based alloy, copper, brass, or gold around a sapphire window.

The window materials may include for example, without limitation, one or more of fused silica, YAG, ALON, aluminosilicate, borosilicate glass, sapphire, zinc selenide, zinc sulfide, quartz crystal, fused quartz, diamond, magnesium fluoride. Crystalline optical materials may be used for the window; since these materials cannot be melted, they cannot be used in the traditional method of manufacturing as shown in FIG. 2, but they can be easily used in the method of the invention shown in FIG. 4. Frame materials may include for example, without limitation, one or more of Inconel®, Hastelloy®, aluminum, brass, copper, gold, tin, Babbitt, indium, beryllium, steel, titanium, platinum, rhodium, or any of hundreds of pure or alloy metals with relative low melting temperatures.

Figure 5:
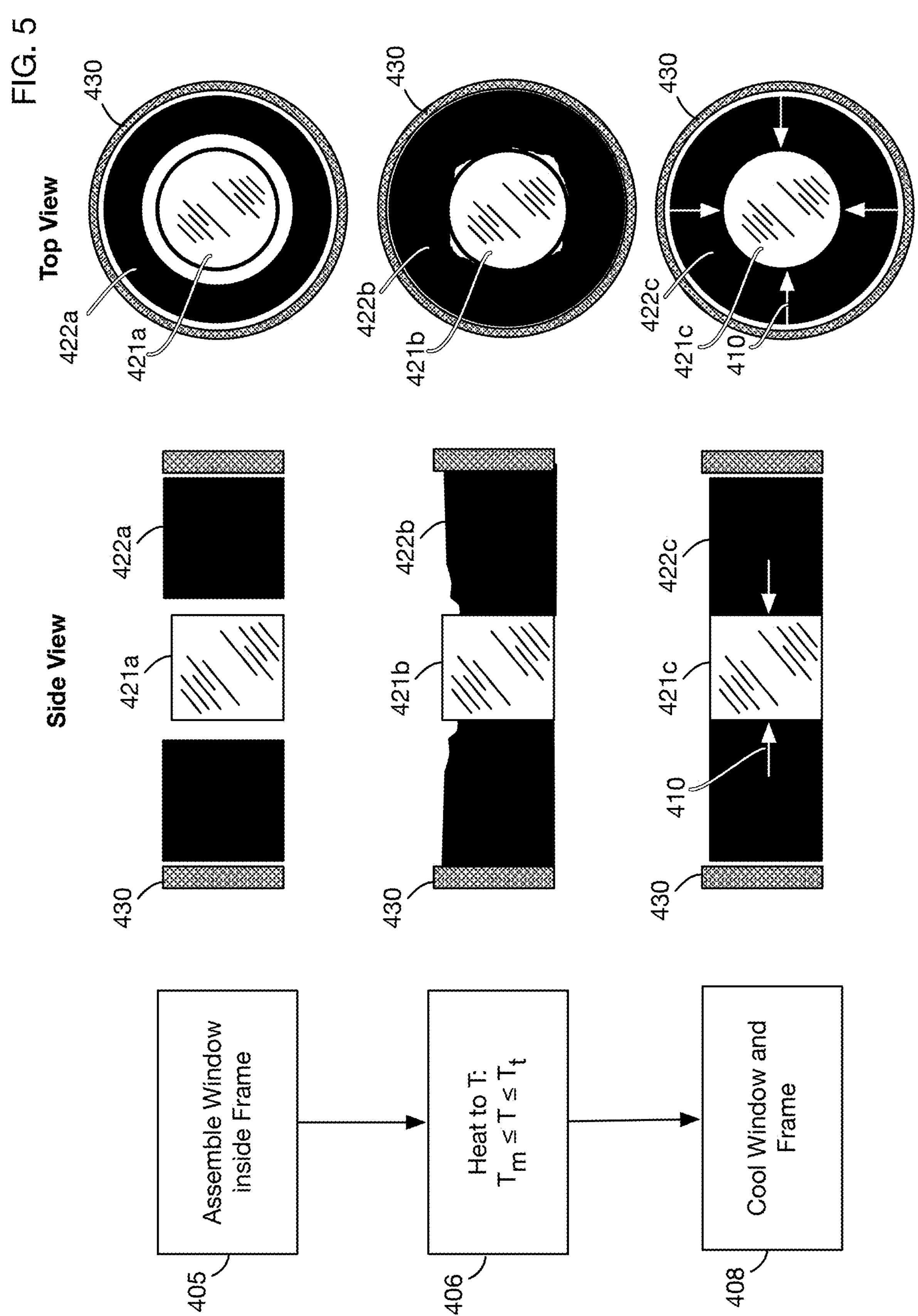
FIG. 5 illustrates steps of the flowchart of FIG. 4.

FIG. 5 illustrates steps of FIG. 4 with a schematic side cross-section view and top view of the components as the manufacturing process progresses. In this illustrative example, the window and the frame are circular. Step 405 shows the initial window 421*a* placed inside the initial frame 422*a*, which is in the shape of a ring. The frame 422*a* and window 421*a* are placed inside a containment structure 430, which contains the frame 422*a* when it melts in step 406. Step 406 shows the window 421*b* and frame 422*b* after heating; the material of the frame 422*b* flows from the inner frame edge onto the outer edge of the window; the window state 421*b* is effectively unchanged because the temperature does not exceed the threshold temperature. The outer edge of melting frame 422*b* is contained within structure 430. After cooling step 408, the frame 422*c* contracts around the window 421*c* and applies compressive force 410 to strengthen the window. The fused metal sight window containing frame 422*c* and window 421*c* is then removed from the containment structure 430.

Figure 6:
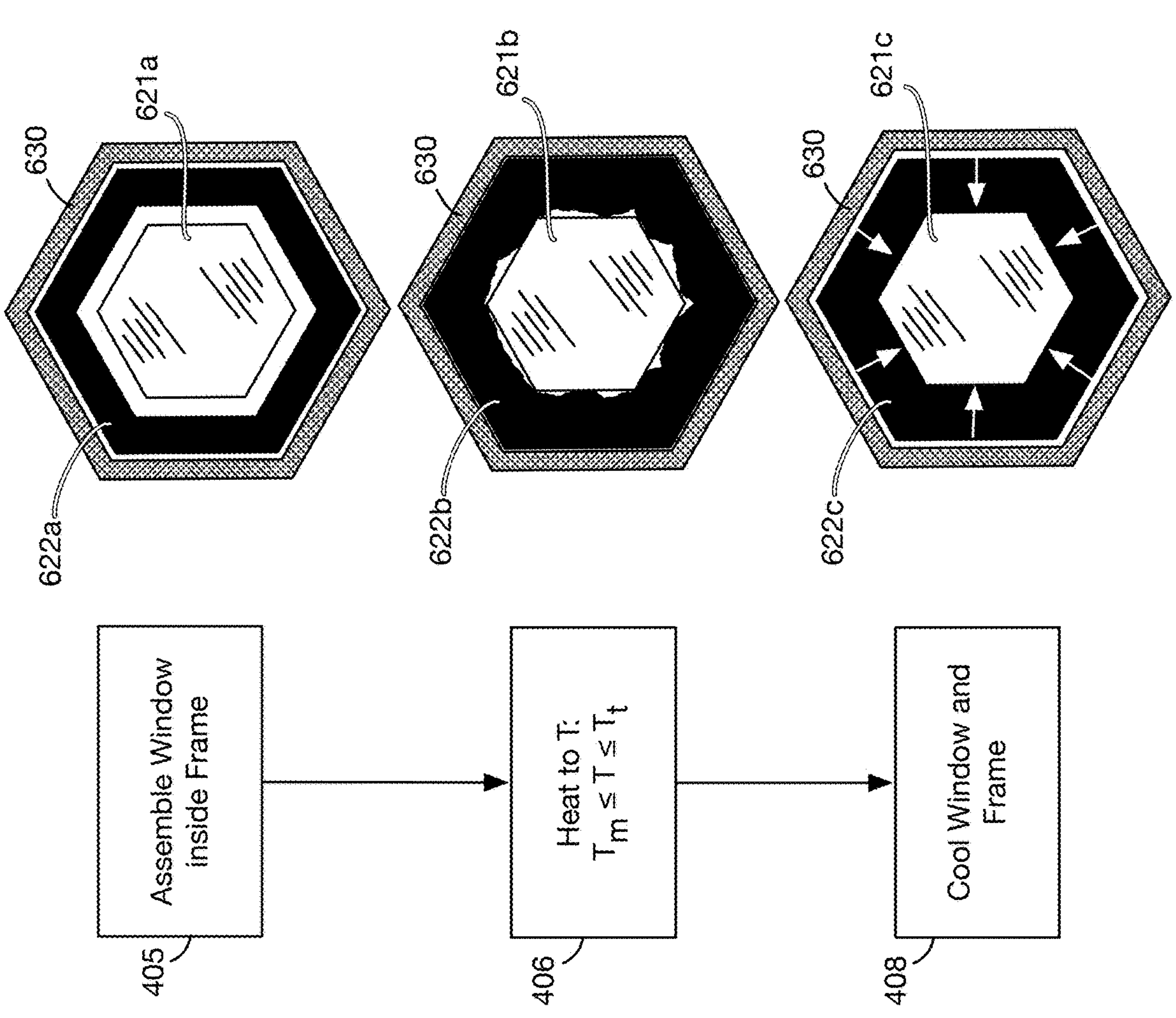
FIG. 6 illustrates steps of the flowchart of FIG. 4 for a sight window with a geometric shape that is not circular.

FIG. 6 illustrates the same steps 405, 406, and 408 for a hexagonal window and a hexagon frame, shown in top view only. In one or more embodiments the window and frame may be of any desired shapes, including but not limited to circular, elliptical, oval, and polygonal with any number of sides. As in FIG. 5, the inner edge of heated metal frame 622*b* flows in step 406 to the outer edge of heated window 621*b*, and after cooling the frame 622*c* compresses around window 621*c*. The containment structure 630 surrounding the frame and window is also hexagonal in this example.

In some applications it may be desirable to combine a window material with a frame material where the window material would be damaged if heated to the melting temperature of the metal frame. An example of this is when sealing a zinc selenide window into a stainless steel 316 metal housing. Zinc selenide is a crystalline material that will be destroyed if taken over 350 C whereas, the stainless steel 316 housing melts at over 1375 C. A solution in these situations is to extend the flowchart of FIG. 4 with a three-component assembly that includes the window, an inner frame around the window with a lower melting point, and an outer housing around the inner frame with the high melting point metal. The inner frame melts and fuses between the window and the outer housing. For example, the inner frame may be made of a transition metal, such as indium or a low temperature indium alloy, or a gold/tin alloy.

FIG. 7 shows a flowchart of an illustrative embodiment of this process. Window 421 and frame 422 are obtained as in FIG. 4; the "frame" in this embodiment is an inner frame that is sandwiched between the window and an outer housing 723. The outer housing contains a second metal with a melting temperature 713 that is higher than the melting temperature 412 of the frame material. In step 405*a* the window is placed inside the (inner) frame, and the frame and window are placed inside the outer housing. In step 406*a* the assembly is heated to temperature 416*a* that is at or above the melting temperature 412 of the (inner) frame, but below the melting temperature of the window and the outer frame. In step 407*a* an elevated temperature is maintained until the inner edge of the frame flows onto and fuses with the outer edge of the window, and the outer edge of the frame flows onto and fuses with the inner edge of the outer housing. In step 408*a* the entire assembly is cooled, resulting in the complete fused metal sight window 430*a*.

Figure 8:
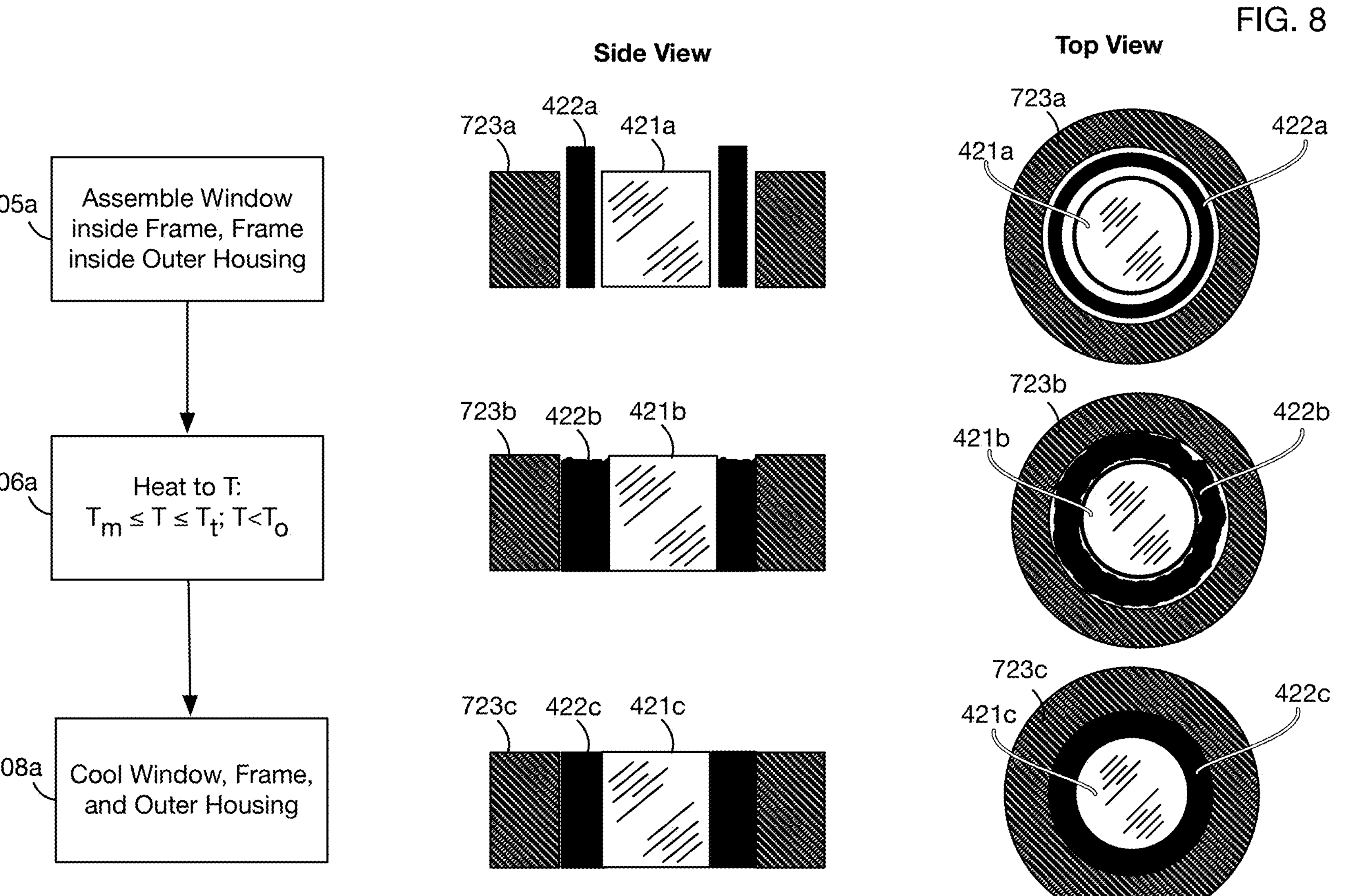
FIG. 8 illustrates steps of the flowchart of FIG. 7.

FIG. 8 illustrates steps of the process of FIG. 7, with schematic side cross-section and top views of the components. In step 405*a* the (inner) frame 422*a* is sandwiched between the window 421*a* and the outer housing 723*a*. In step 406*a* the heated inner frame 422*b* flows to contact the inner edge of the heated outer housing 723*b*, and the outer edge of the heated window 421*b*. In step 408*a* the components are cooled resulting in the final sight window with the inner frame 422*c* fused to window 421*c* and outer housing 723*c*.

In the process illustrated in FIGS. 7 and 8, the inner frame is melted to join the window to the outer housing. Unlike brazing, this process does not rely on capillary action for the metal to flow into the joint space between the joined parts. Instead, the entire inner and outer edges of the inner frame are melted, and they flow to meet the window and outer housing, respectively. Because the inner frame melts and flows both inward and outward, it can fill a large gap between the window and the outer housing. In contrast, brazing can only be used to join close-fitting parts.

The process illustrated in FIGS. 7 and 8 also differs from typical soldering processes because soldering uses filler alloys that melt at a relatively low temperature, generally below 450 C; soldering also creates relatively weak joints that would not be suitable for sight windows. (Silver soldering is an exception, but like brazing it relies on capillary action and cannot be used to fill large gaps.) In contrast the process of FIGS. 7 and 8 generates a strong joint by melting the metal inner frame at a potentially higher temperature until it flows to fill the entire gap between the window and the outer housing.

While the invention herein disclosed has been described by means of specific embodiments and applications thereof, numerous modifications and variations could be made thereto by those skilled in the art without departing from the scope of the invention set forth in the claims.

What is claimed is:

1. A method for manufacturing a fused metal sight window with a high flow temperature optical material, comprising:
  placing a window inside a frame, wherein
    said window comprises an optical material that can be heated to a threshold temperature at or below which said optical material does not flow and is not damaged,
    said window further comprises an outer window edge,
    said frame comprises a metal having a melting temperature below said threshold temperature, and
    said frame further comprises an inner frame edge and an outer frame edge;
  heating said window and said frame to a heating temperature greater than or equal to said melting temperature of said metal of said frame and less than or equal to said threshold temperature, maintaining said heating temperature of said window and said frame for a period of time until said inner frame edge flows onto said outer window edge and said metal of said frame at said inner frame edge fuses with said optical material of said window at said outer window edge, and wherein the optical material of the window does not flow and is not damaged; and,
  cooling said window and said frame to form a fused metal sight window.

2. The method for manufacturing the fused metal sight window with the high flow temperature optical material of claim 1, wherein said frame is a ring.

3. The method for manufacturing the fused metal sight window with the high flow temperature optical material of claim 1, wherein said frame is a geometrical shape other than a ring.

4. The method for manufacturing the fused metal sight window with the high flow temperature optical material of claim 1, wherein said optical material comprises a crystalline optical material.

5. The method for manufacturing the fused metal sight window with the high flow temperature optical material of claim 1, wherein said optical material comprises one or more of fused silica, aluminosilicate, borosilicate glass, YAG, ALON, sapphire, zinc selenide, zinc sulfide, quartz crystal, fused quartz, diamond, and magnesium fluoride.

6. The method for manufacturing the fused metal sight window with the high flow temperature optical material of claim 1, wherein said optical material comprises sapphire; and,
  said metal comprises one or more of stainless steel, a nickel-based alloy, copper, brass, gold, titanium, platinum, and rhodium.

7. The method for manufacturing the fused metal sight window with the high flow temperature optical material of claim 1, further comprising
  wherein said metal of said frame is a first metal and said melting temperature is a first melting temperature;
  placing said frame and said window inside an outer housing, such that said frame is sandwiched between the window and the outer housing;
  wherein said outer housing comprises
    a second metal having a second melting temperature greater than said first melting temperature, and
    an inner housing edge wherein said outer frame edge fits inside said inner housing edge;
  wherein said heating said window and said frame further comprises heating said outer housing to said heating temperature greater than or equal to said first melting temperature of said first metal of said frame, less than or equal to said threshold temperature, and less than said second melting temperature of the outer housing, and wherein said maintaining said heating temperature of said window and said frame further comprises maintaining said heating temperature of the outer housing which occurs until said outer frame edge flows onto said inner housing edge and said first metal of said frame fuses with said second metal of said outer housing;
  wherein said cooling further comprising cooling said outer housing to form said fused metal sight window.

8. The method for manufacturing the fused metal sight window with the high flow temperature optical material of claim 7, wherein said optical material comprises zinc selenide;

said second metal comprises stainless steel; and, said first metal comprises a transition metal.

9. The method for manufacturing the fused metal sight window with the high flow temperature optical material of claim 7, wherein said inner frame edge flows onto said outer window edge without using capillary action; and, said outer frame edge flows onto said inner housing edge without using capillary action.

10. The method for manufacturing the fused metal sight window with the high flow temperature optical material of claim 7, wherein joining said window, said frame, and said outer housing to form said fused metal sight window does not comprise brazing and does not comprise soldering.

11. A method for manufacturing a fused metal sight window with a high flow temperature optical material, comprising:

placing a window inside a frame, wherein said window comprises an optical material that can be heated to a threshold temperature at or below which said optical material does not flow and is not damaged, said optical material comprises one or more of fused silica, aluminosilicate, borosilicate glass, YAG, ALON, sapphire, zinc selenide, zinc sulfide, quartz crystal, fused quartz, diamond, magnesium fluoride, said window further comprises an outer window edge, said outer window edge comprises a circular shape, said frame comprises a metal having a melting temperature below said threshold temperature, said metal comprises one or more of stainless steel, a nickel-based alloy, copper, brass, gold, titanium, platinum, and rhodium, said frame further comprises an inner frame edge and an outer frame edge, and said inner frame edge comprises a circular shape;

heating said window and said frame to a heating temperature greater than or equal to said melting temperature of said metal of said frame and less than or equal to said threshold temperature, maintaining said heating temperature of said window and said frame for a period of time until said inner frame edge flows onto said outer window edge and said metal of said frame at said inner frame edge fuses with said optical material of said window at said outer window edge, and wherein the optical material of the window does not flow and is not damaged; and, cooling said window and said frame to form a fused metal sight window.

12. A method for manufacturing a fused metal sight window with a high flow temperature optical material, comprising:

placing a window inside a frame and placing said frame and said window inside an outer housing, such that said frame is sandwiched between the window and the outer housing;

wherein said window comprises an optical material that can be heated to a threshold temperature at or below which said optical material does not flow and is not damaged, said window comprises an outer window edge, said frame comprises a first metal having a first melting temperature below said threshold temperature, said frame comprises an inner frame edge and an outer frame edge, said outer housing comprises a second metal having a second melting temperature greater than said first melting temperature, and said outer housing comprises an inner housing edge wherein said outer frame edge fits inside said inner housing edge;

heating said window, said frame and said outer housing to a heating temperature greater than or equal to said first melting temperature of said first metal, less than or equal to said threshold temperature, and less than said second melting temperature of the outer housing;

maintaining said heating temperature of said window, said frame and said outer housing for a period of time until said inner frame edge flows onto said outer window edge and said first metal of said frame at said inner frame edge fuses with said optical material of said window at said outer window edge, and wherein the optical material of the window does not flow and is not damaged such that a state of the window is unchanged; and said outer frame edge flows onto said inner housing edge and said first metal of said frame fuses with said second metal of said outer housing;

thereby joining the window to the outer housing and joining said window, said frame and said outer housing; and, cooling said window to form a fused metal sight window;

wherein said joining said window, said frame and said outer housing to form said fused metal sight window does not comprise brazing and does not comprise soldering.

* * * * *